United States Patent [19]

Antos et al.

[11] Patent Number: 4,594,334
[45] Date of Patent: Jun. 10, 1986

[54] PLATINUM-, RHENIUM-, INDIUM-CONTAINING CATALYSTS FOR CONVERSION OF HYDROCARBONS

[75] Inventors: George J. Antos, Bartlett; Li Wang, Westmont, both of Ill.

[73] Assignee: UOP Inc., Des Plaines, Ill.

[21] Appl. No.: 703,071

[22] Filed: Feb. 19, 1985

[51] Int. Cl.[4] .................. B01J 27/045; B01J 27/125; B01J 27/13; C10G 35/06
[52] U.S. Cl. .................. 502/223; 208/139; 502/230
[58] Field of Search .................. 502/223, 230

[56] References Cited

U.S. PATENT DOCUMENTS

| | | | |
|---|---|---|---|
| 2,892,858 | 6/1959 | Ziegler | 260/448 |
| 3,852,190 | 12/1974 | Buss et al. | 208/138 |
| 3,887,495 | 6/1975 | Juguin et al. | 252/464 |
| 3,892,657 | 7/1975 | Wilhelm | 208/139 |
| 3,980,721 | 9/1976 | Juguin et al. | 260/668 D |
| 4,012,313 | 3/1977 | Buss et al. | 208/139 |
| 4,110,200 | 8/1978 | Antos | 208/139 |
| 4,175,031 | 11/1979 | Antos | 208/138 |
| 4,179,405 | 12/1979 | Antos | 252/441 |
| 4,214,980 | 7/1980 | LePage et al. | 208/139 |
| 4,250,056 | 2/1981 | LePage et al. | 252/441 |

Primary Examiner—P. E. Konopka
Attorney, Agent, or Firm—Thomas K. McBride; John F. Spears, Jr.

[57] ABSTRACT

A novel catalytic composite for the conversion of hydrocarbons is disclosed. The catalytic composite comprises a refractory inorganic oxide, a first uniform dispersion of a platinum component and a rhenium component, and a second dispersion of an indium component thereover. The composite further comprises a halogen component and a sulfur component. In addition to a novel catalytic composite there is also disclosed a method of preparing the composite and a novel process for the use of the composite.

14 Claims, 3 Drawing Figures

Catalyst Life, BPP.

PLATINUM-, RHENIUM-, INDIUM-CONTAINING CATALYSTS FOR CONVERSION OF HYDROCARBONS

BACKGROUND OF THE INVENTION

This invention relates to a catalytic composite for the conversion of hydrocarbons. Additionally, the invention relates to a method of making the novel catalyst and to a process for the use of the catalyst. The catalyst of the present invention is particularly useful in the catalytic reforming of hydrocarbons boiling in the gasoline range to produce in high yield a high octane reformate suitable for blending gasolines of improved antiknock properties for producing a high aromatics content reformate suitable as a petrochemical feedstock.

INFORMATION DISCLOSURE

Catalytic compositions comprising platinum on refractory inorganic oxides are well known in the art. Additionally, it is known that many components may be added to platinum-containing compositions to obtain catalysts with improved performance. For example, U.S. Pat. No. 3,892,657 discloses a hydrocarbon conversion catalyst comprising a platinum component and indium component on a porous carrier material. The platinum and indium components are uniformly dispersed throughout the porous carrier material. It is additionally taught that a further component comprising a Group IVA metallic component may be advantageously added to the catalyst. The specific catalyst taught therein is disclosed as having particular utility for the catalytic reforming of low-octane gasoline fractions.

Related U.S. Pat. Nos. 3,887,495 and 3,980,721 disclose catalytic composites particularly suitable for dehydrogenating saturated hydrocarbons. These references disclose a catalytic composite containing alumina, at least one metal selected from Groups VIB and VIIB of the periodic classification of the elements, at least one metal selected from Groups IIIA, IVA and VA of the periodic classification of the elements, and optionally at least one metal from Group VIII of the periodic classification. Accordingly, these references disclose a catalyst which may comprise alumina, rhenium, indium, and platinum.

U.S. Pat. Nos. 4,214,980 and 4,250,056 both broadly disclose catalytic compositions which may be used for the reforming of hydrocarbons. The catalysts disclosed comprise platinum, rhenium, indium, and a halogen component. The reference discloses that the catalyst may be prepared according to conventional methods consisting of impregnating the alumina with solutions of compounds of the metals to be introduced; either with a common solution of the metal compounds or with separate solutions for each metal compound. One specific method of preparation is disclosed as consisting of impregnating the carrier with an aqueous solution of indium nitrate or other compound, drying at about 120° C. and calcining in air for a few hours at a temperature of 500° to 1000° C., preferably about 700° C.; a second impregnation is then performed with a solution containing rhenium and platinum. A second method is disclosed as consisting of impregnating the carrier with a solution containing simultaneously platinum, indium, and rhenium. Yet another method is disclosed as consisting of introducing the metal elements by a number of successive impregnations equal to the number of metal elements to be introduced into the catalyst. The references are vague as to the exact method of preparing the catalysts exemplified therein; however, it would appear as though all three metal components were added by impregnation with a single solution. The reference is silent as to the advantages to be achieved by depositing the metal as separate dispersions. Additionally, the references do not disclose the incorporation of a sulfur component into the catalysts.

U.S. Pat. Nos. 4,110,200 and 4,179,405 both disclose catalytic composites having particular utility in the catalytic reforming of hydrocarbons. The catalysts disclosed comprise a platinum group component, a rhenium component, a cobalt component, an indium component, and a halogen component with a porous carrier material. The catalysts are disclosed as being sulfur-free. It is further disclosed that the catalysts of these references can be made in any conventional fashion and the exemplified embodiment was prepared using a single impregnation solution comprising precursor compounds of platinum component, rhenium component, cobalt component, and indium component.

U.S. Pat. No. 4,175,031 discloses a catalytic composite comprising platinum, rhenium, and indium having particular utility in the reforming of hydrocarbons. It is disclosed in this reference that the rhenium component should be composited with the catalyst as a pyrolyzed carbonyl. The catalyst of this reference is not disclosed as containing a sulfur component. A crucial feature of the invention of the reference involves subjecting the oxidized platinum- and indium-containing and typically halogen treated carrier material to a water-free reduction step before the incorporation of the rhenium component by means of the rhenium carbonyl reagent. The exemplified embodiment of the invention of this reference was prepared in accordance with that procedure.

In summary then it can be seen that the art has recognized that a platinum-, rhenium-, and indium-containing catalyst may be utilized to advantage in catalytic reforming. It has now been discovered, however, that unexpected and surprising results may be achieved by incorporating into a catalytic composite a first uniform dispersion of a platinum component and a rhenium component, a second dispersion of an indium component thereover, a halogen component, and a sulfur component.

OBJECTS AND EMBODIMENTS

It is an object of the present invention to provide a novel catalytic composite having increased activity and selectivity. It is also an object of the invention to provide a new process for the conversion of hydrocarbons. A corollary objective of the present invention is to provide a novel method of reforming a naphtha boiling range hydrocarbon charge stock to improve the antiknock properties thereof. It is yet a further object of the present invention to provide a novel method of preparing a catalytic composite.

Accordingly, in a broad embodiment the present invention comprises a catalytic composite comprising a refractory inorganic oxide, a first uniform dispersion of a platinum component and a rhenium component, a second dispersion of an indium component thereover, a halogen component, and a sulfur component.

In an alternative embodiment the present invention provides a method of preparing a catalytic composite comprising compositing a refractory inorganic oxide with a first uniform dispersion of a platinum component and a rhenium component, a second dispersion of an indium component thereover, a halogen component, and a sulfur component. In yet another embodiment the present invention is a process for the conversion of hydrocarbons comprising contacting a hydrocarbon charge stock at hydrocarbon conversion conditions with a catalytic composite comprising a refractory inorganic oxide, a first uniform dispersion of a platinum component and a rhenium component, a second dispersion of an indium component thereover, a halogen component, and a sulfur component.

In a more limited embodiment the present invention provides a process for the catalytic reforming of a naphtha boiling range charge stock comprising contacting the charge stock at reforming conditions with a catalytic composite comprising a Ziegler alumina support containing a first uniform dispersion of a platinum component and a rhenium component, a second dispersion of an indium component, a halogen component, and a sulfur component, wherein on an elemental basis and calculated on the weight of the finished composite, there is from about 0.01 to about 5 wt. % each of platinum component, rhenium component and indium component, and from about 0.01 to about 10 wt. % each of halogen component and sulfur component.

These as well as other objects and embodiments will become apparent upon a reading of the following detailed description of the invention.

DETAILED DESCRIPTION OF THE INVENTION

To reiterate briefly, the present invention relates to a catalytic composite comprising a refractory inorganic oxide, a first uniform dispersion of a platinum component and a rhenium component, a second dispersion of an indium component thereover, a halogen component, and a sulfur component. As a result of forming the platinum component and rhenium component as a first uniform dispersion and the indium component as a second dispersion in the presence of a halogen component and sulfur component, a catalytic composite having improved selectivity and activity is thereby provided.

Considering first the inorganic refractory oxide utilized in the present invention as a catalyst support, it is preferred that the material be a porous, adsorptive, high surface area support having a surface area of about 25 to about 500 m$^2$/g. The refractory inorganic oxide material should be relatively refractory to the conditions utilized in the hydrocarbon conversion process, and it is intended to include within the scope of the present invention catalyst carrier materials which have traditionally been utilized in dual function hydrocarbon conversion catalysts such as silica or silica gel, silicon carbide, clays and silicates, including those synthetically prepared and naturally occurring, which may or may not be acid treated, for example, attapulgus clay, china clay, diatomaceous earth, fuller's earth, kaolin, kieselguhr, etc. Also included are ceramics, porcelain, crushed firebrick, and bauxite. Refractory inorganic oxides such as alumina, titanium dioxide, zirconium dioxide, hafnium oxide, beryllium oxide, vanadium oxide, cesium oxide, chromium oxide, zinc oxide, magnesia, thoria, boria, silica-alumina, silica-magnesium, chromia-alumina, alumina-boria, and silica-zirconia are also included. Additionally, the refractory inorganic oxide may comprise zeolitic crystalline alumina silicates such as naturally-occurring or synthetically-prepared mordenite and/or faujasite, either in the hydrogen form or in a form which has been treated with multivalent cations. Spinels such MgAl$_2$O$_4$, FeAl$_2$O$_4$, ZnAl$_2$O$_4$, CaAl$_2$O$_4$, and other like compounds may be used. It should also be understood that combinations of any of these compounds may also be employed.

The preferred refractory inorganic oxide for use in the present invention is alumina. Suitable alumina materials are the crystalline aluminas known as the gamma- , eta- , and theta-alumina, with gamma- or eta-alumina giving best results. The preferred refractory inorganic oxide will have an apparent bulk density of about 0.3 to about 1.01 g/cc and surface area characteristics such that the average pore diameter is about 20 to 300 Angstroms, the pore volume is about 0.1 to about 1 cc/g and the surface area is about 100 to about 500 m$^2$/g.

Although alumina is the preferred refractory inorganic oxide a particularly preferred alumina is that which has been characterized in U.S. Pat. Nos. 3,852,190 and 4,012,313 as a byproduct from a Ziegler higher alcohol synthesis reaction as described in Ziegler's U.S. Pat. No. 2,892,858. For purposes of simplification such an alumina will be hereinafter referred to as a "Ziegler alumina." Ziegler alumina is presently available from the Conoco Chemical Division of Continental Oil Company under the trademark Catapal. This material is an extremely high purity alpha-alumina monohydrate (boehmite) which after calcination at a high temperature has been shown to yield a high purity gamma-alumina. It is commercially available in three forms: (1) Catapal SB— a spray-dried powder having a typical surface area of about 250 m$^2$/g; (2) Catapal MG—a rotary kiln dried alumina having a typical surface area of about 180 m$^2$/g; and (3) Dispal M—a finely divided dispersible product having a typical surface area of about 185 m$^2$/g. For purposes of the present invention, the preferred starting material is the spray-dried powder, Catapal SB. This alpha-alumina monohydrate powder may be formed into a suitable catalyst material according to any of the techniques known to those skilled in the catalyst carrier material forming art. Spherical carrier material particles may be formed, for example, from this Ziegler alumina by: (1) converting the alpha-alumina monohydrate powder into an alumina sol by reaction with a suitable peptizing acid and water and thereafter dropping a mixture of the resulting sol and a gelling agent into an oil bath to form spherical particles of an alumina gel which are easily converted to a gamma-alumina carrier material by known methods; (2) forming an extrudate from the powder by established methods and thereafter rolling the extrudate particles on a spinning disk until spherical particles are formed which can then be dried and calcined to form the desired particles of spherical carrier material; and (3) wetting the powder with a suitable peptizing agent and thereafter rolling the particles of the powder into spherical masses of the desired size. This alumina powder can also be formed in any other desired shape or type of carrier material known to those skilled in the art such as rods, pills, pellets, tablets, granules, extrudates, and like forms by methods well known to the practitioners of the catalyst material forming art. The preferred type of carrier material for the present invention is a cylindrical extrudate generally having a diameter of about 0.8 to 3.2 mm (especially 1.6 mm) and a length to diameter ratio of about 1:1 to about 5:1, with 2:1 being especially preferred. The especially preferred extrudate form of the carrier material is preferably prepared by mixing the alumina powder with water and suitable peptizing agents such as nitric acid, acetic acid, aluminum nitrate, and the like material until an extrudable dough is formed. The amount of water added to form the dough is typically sufficient to give a loss on ignition (LOI) at 500° C. of about 45 to 65 wt. %, with a value of 55 wt. % being especially preferred. On the other hand, the acid addition rate is generally sufficient to provide 2 to 7 wt. % of the volatile-free alumina powder used in the mix, with a value of 3% to 4% being especially preferred. The resulting dough is then extruded through a suitably sized die to form extrudate particles. These particles are then dried at a temperature of about 260° to about 427° C. for a period of about 0.1 to 5 hours and thereafter calcined at a temperature of about 480° to 816° C. for a period of 0.5 to 5 hours to form the preferred extrudate particles of the Ziegler alumina refractory inorganic oxide. It is preferred that the refractory inorganic oxide comprise substantially pure Ziegler alumina having an apparent bulk density of about 0.6 to about 1 g/cc a surface area of about 150 to 280 $m^2/g$ (preferably 185 to 235 $m^2/g$, at a pore volume of 0.3 to 0.8 cc/g).

An essential feature of the catalyst of the instant invention is a first uniform dispersion of a platinum component and a rhenium component. It is to be understood that by the phrase "a first uniform dispersion" it is meant a first application of platinum component and rhenium component formed by compositing the refractory inorganic oxide with the platinum component and rhenium component in a manner which results in relatively uniform distributions thereof throughout the refractory inorganic oxide and thereafter applying at least one oxidation step prior to incorporating the second dispersion of indium component.

The platinum component and rhenium component may be composited with the refractory inorganic oxide in any manner which results in a relatively uniform distribution of these components such as coprecipitation, or cogelation, coextrusion, ion exchange or impregnation. The preferred method of preparing the catalytic composite involves the utilization of soluble decomposable compounds of platinum and rhenium for impregnation of the refractory inorganic oxide in a relatively uniform manner. For example, the platinum and rhenium components may be added to the refractory inorganic oxide by commingling the latter with an aqueous solution of chloroplatinic acid and thereafter an aqueous solution of perrhenic acid. Other water-soluble compounds or complexes of platinum and rhenium may be employed in the impregnation solutions. Typical platinum compounds include ammonium chloroplatinate, bromoplatinic acid, platinum trichloride, platinum tetrachloride hydrate, platinum dichlorocarbonyl dichloride, dinitrodiaminoplatinum, sodium tetranitroplatinate (II), etc. Decomposable rhenium compounds which may be employed include ammonium perrhenate, sodium perrhenate, potassium perrhenate, potassium rhenium oxychloride, potassium hexachlororhenate (IV), rhenium chloride, rhenium heptoxide, and the like compounds. The utilization of a platinum halogen compound, such as chloroplatinic acid, is preferred since it facilitates the incorporation of both the platinum component and at least a minor quantity of the halogen component in a single step. It is further preferred that an aqueous solution of perrhenic acid be employed in impregnation of the rhenium component.

As heretofore indicated, any procedure may be utilized in compositing the platinum component and rhenium component with the refractory inorganic oxide as long as such method is sufficient to result in relatively uniform distributions of these components. Accordingly, when an impregnation step is employed the platinum component and rhenium component may be impregnated by use of separate impregnation solutions or as is preferred a single impregnation solution comprising decomposable compounds of platinum component and rhenium component. In fact, excellent results are obtained with a one-step impregnation procedure using an aqueous acidic solution containing chloroplatinic acid, perrhenic acid and hydrochloric acid to impregnate a calcined refractory inorganic oxide comprising alumina. It should be noted that irrespective of whether single or separate impregnation solutions are utilized hydrogen chloride, nitric acid, or the like acid may be also added to the impregnation solution or solutions in order to further facilitate uniform distributions of the platinum and rhenium components throughout the refractory inorganic oxide. Additionally, it should be indicated that it is generally preferred to impregnate the refractory inorganic oxide after it has been calcined in order to minimize the risk of washing away valuable platinum and rhenium compounds; however, in some cases it may be advantageous to impregnate refractory inorganic oxide when it is in a gelled, plastic dough or dried state. If two separate impregnation solutions are utilized in order to composite the platinum component and rhenium component with the refractory inorganic oxide, separate oxidation and reduction steps may be employed between application of the separate impregnation solutions. Additionally, halogen adjustment steps may be employed between application of the separate impregnation solutions. Such halogenation steps will facilitate incorporation of the catalytic components and halogen component into the refractory inorganic oxide. As heretofore indicated, formation of the first uniform dispersion of platinum component and rhenium component requires application of at least one oxidation step prior to addition of the second dispersion of indium component. The oxidation step acts to assure fixation of the platinum component and rhenium component so that the uniform dispersion thereof is retained. It should be understood that such an oxidation step may be immediately followed by halogen adjustment step. Additionally, a reduction step may be employed either prior to or subsequent to the oxidation step. A reduction step may also follow the halogen adjustment step. However, as indicated above, an oxidation step must be employed prior to the addition of the second dispersion of indium component to assure formation of the first uniform dispersion of platinum component and rhenium component.

Irrespective of its exact formation the first uniform dispersion of platinum component and rhenium component must be sufficient so that the platinum component comprises, on an elemental basis, from about 0.1 to about 5.0 wt. % of the finished catalytic composite. Additionally, there must be sufficient rhenium component present to comprise, on an elemental basis, from about 0.1 to about 5.0 wt. % of the finished composite. It is preferred that the catalytic composite of the present invention comprise sufficient platinum component and rhenium component to result in a weight ratio, on an elemental basis, of platinum component to rhenium component of from about 0.3 to about 3.0. It is especially preferred that there be sufficient platinum component and rhenium component to result in a platinum component to rhenium component weight ratio of about 1.

Another essential feature of the catalyst of the present invention is a second dispersion of an indium component over the first uniform dispersion of platinum component and rhenium component. It is to be understood that by the phrase "a second dispersion of indium component thereover" it is meant a second application of indium component over the first uniform dispersion of platinum and rhenium component, said second dispersion being formed by contacting the platinum- and rhenium-containing refractory inorganic oxide with indium in a manner which results in a dispersion thereof throughout the refractory inorganic oxide. Any suitable decomposable indium compound may be utilized to incorporate the indium component into the catalytic composite. Impregnation is a particularly suitable means of contacting the indium with the refractory inorganic oxide. In general, the solvent used in such an impregnation step is selected on the basis of the capability to dissolve the desired indium compound and is preferably an aqueous, acidic solution. Thus, the indium component may be added to the refractory inorganic oxide by commingling the latter with an aqueous, acidic solution of suitable indium salt or suitable compound of indium such as indium tribromide, indium perchlorate, indium trichloride, indium trifluoride, indium nitrate, indium sulfate, and the like compounds. A particularly preferred impregnation solution comprises an acidic solution of indium trichloride in water. Following impregnation of the second dispersion of indium component, the resulting composite may then be subjected to an oxidation step followed by a halogen adjustment step and subsequent reduction step. Irrespective of the exact method of forming the second dispersion, sufficient indium component should be contained therein to comprise, on an elemental basis, from about 0.01 to about 5 wt. % of the finished composite.

As heretofore indicated, in formation of the catalyst of the present invention, it is necessary to employ at least one oxidation step. The conditions employed to effect the oxidation step are selected to convert substantially all of the metallic components within the catalytic composite to their corresponding oxide form. The oxidation step typically takes place at a temperature of from about 371° to about 593° C. An oxygen atmosphere is employed typically comprising air. Generally the oxidation step will be carried out for a period of from about 0.5 to about 10 hours or more, the exact period of time being that required to convert substantially all of the metallic components to their corresponding oxide form. This time will, of course, vary with the oxidation temperature employed and the oxygen content of the atmosphere employed.

In addition to the oxidation step a halogen adjustment step may also be employed in preparing the catalyst of the present invention. As heretofore indicated, the halogen adjustment step may serve a dual function. First the halogen adjustment step aids in formation of the first uniform dispersion of platinum and rhenium component and the second dispersion of indium component. Additionally, since the catalyst of the instant invention comprises a halogen component, the halogen adjustment step can serve as a means of incorporating the desired level of halogen into the final catalytic composite. The halogen adjustment step employs a halogen or halogen-containing compound in air or an oxygen atmosphere. Since the preferred halogen for incorporation into the catalytic composite comprises chlorine, the preferred halogen or halogen-containing compound utilized during the halogen adjustment step is chlorine, HCl, or precursor of these compounds. In carrying out the halogen adjustment step the catalytic composite is contacted with the halogen or halogen-containing compound in air or an oxygen atmosphere at an elevated temperature of from about 371° to about 593° C. It is further desired to have water present during the contacting step in order to aid in the adjustment. In particular, when the halogen component of the catalyst comprises chlorine, it is preferred to use a mole ratio of water to HCl of about 5:1 to about 100:1. The duration of the halogenation step is typically from about 0.5 to about 5 hours or more. Because of the similarity of conditions the halogen adjustment step may take place during the oxidation step. Alternatively, the halogen adjustment step may be performed before or after the oxidation step as required by the particular method being employed to prepare the catalyst of the invention. Irrespective of the exact halogen adjustment step employed the halogen content of the final catalyst should be such that there is sufficient halogen to comprise, on an elemental basis, from about 0.1 to about 10 wt. % of the finished composite.

In preparing the catalyst of the present invention as heretofore indicated, it is also necessary to employ a reduction step. The reduction step is designed to reduce substantially all of the platinum component and rhenium component to the corresponding elemental metallic states and to ensure a relatively uniform and finely divided dispersion of these components throughout the refractory inorganic oxide. It is preferred that the reduction step take place in a substantially water-free environment. Preferably, the reducing gas is substantially pure, dry hydrogen (i.e., less than 20 volume ppm water). However, other reducing gases may be employed such as $CO_2$, nitrogen, etc. Typically the reducing gas is contacted with the oxidized catalytic composite at conditions including a reduction temperature of from about 316° to about 649° C. for a period of time of from about 0.5 to 10 or more hours effective to reduce substantially all of the platinum component and rhenium component to the elemental metallic state. The reduction step may be performed prior to loading the catalytic composite into the hydrocarbon conversion zone or it may be performed in situ as part of a hydrocarbon conversion process start-up procedure. However, if this latter technique is employed proper precautions must be taken to pre-dry the hydrocarbon conversion plant to a substantially water-free state and a substantially water-free hydrogen-containing reduction gas should be employed.

It is a further essential feature of the catalyst of the present invention that it comprise a sulfur component. Typically there is sufficient sulfur component present to comprise, on an elemental basis, from about 0.01 to about 10 wt. % of the finished composite. The sulfur component may be incorporated into the catalyst by any known technique. For example, the catalytic composite may be subjected to a treatment which takes place in the presence of hydrogen in a suitable sulfur-containing compound such as hydrogen sulfide, lower molecular weight mercaptans, organic sulfides, disulfides, etc. Typically this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50° up to about 1100° F. or more. It is generally a good practice to perform this sulfiding step under substantially water-free conditions.

As previously indicated, in one aspect the present invention comprises a process for the conversion of hydrocarbons. Accordingly, a hydrocarbon charge stock and the catalyst of the present invention are contacted at hydrocarbon conversion conditions. This contacting may be accomplished by using the catalyst in a fixed-bed system, a moving-bed system, a fluidized-bed system or in a batch-type operation; however, in view of the danger of attrition losses of the valuable catalyst, and of well-known operational advantages, it is preferred to use a fixed-bed system. In this system a hydrogen-rich gas and a charge stock are preheated by any suitable heating means to the desired reaction temperature and then are passed into a conversion zone containing a fixed-bed of the catalyst type previously characterized. It is, of course, understood that the conversion zone may be one or more separate reactors with suitable means therebetween to ensure that the desired conversion temperature is maintained at the entrance to each reactor. It is also important to note that the reactants may be contacted with the catalyst bed in either upward, downward, or radial-flow fashion with the latter being preferred. In addition the reactants may be in the liquid phase, a mixed liquid-vapor phase, or a vapor phase when they contact the catalyst, with results obtained in the vapor phase. In the case where the catalyst of the present invention is used in a reforming operation, the reforming system will comprise a reforming zone containing a fixed-bed of the catalyst type previously characterized. The reforming zone may be one or more separate reactors with suitable heating means therebetween to compensate for the endothermic nature of the reactions that take place in each catalyst bed. The hydrocarbon feed stream that is charged to this reforming system will comprise hydrocarbon fractions containing naphthenes and paraffins that boil within the gasoline range. The preferred charge stocks are those consisting essentially of naphthenes and paraffins, although in some cases aromatics and/or olefins may be present. This preferred class includes straight-run gasolines, natural gasolines, synthetic gasolines, and the like. On the other hand, it is frequently advantageous to charge thermally or catalytically cracked gasolines or higher boiling fractions thereof. Mixtures of straight-run and cracked gasolines can also be used to advantage. The naphtha boiling range charge stock may be a full boiling gasoline having an initial boiling point of from about 50° to about 150° F. and an end point boiling within the range of from about 325° to about 425° F., or may be a selected fraction thereof which generally will be a higher boiling fraction commonly referred to as a heavy naphtha—for example, a naphtha boiling in the range of $C_7$ to 400° F. In some cases, it is also advantageous to charge pure hydrocarbons or mixtures of hydrocarbons that have been extracted from hydrocarbon distillates—for example, straight-chain paraffins—which are to be converted to aromatics. It is preferred that these charge stocks be treated by conventional catalytic pretreatment methods such as hydrorefining, hydrotreating, hydrodesulfurization, etc., to remove substantially all sulfurous, nitrogenous, and water yielding contaminants therefrom and to saturate any olefins that may be contained therein.

In other hydrocarbon conversion embodiments, the charge stock will be of the conventional type customarily used for the particular kind of hydrocarbon conversion being effected. For example, in a typical isomerization embodiment the charge stock can be a paraffinic stock rich in $C_4$ to $C_8$ normal paraffins, or a normal butane-rich stock, or an n-hexane-rich stock, or a mixture of xylene isomers, etc. In a dehydrogenation embodiment, the charge stock can be any of the known dehydrogenatable hydrocarbons such as an aliphatic compound containing 2 to 30 carbon atoms per molecule, a $C_4$ to $C_{30}$ normal paraffin, a $C_8$ to $C_{12}$ alkylaromatic, a naphthene and the like. In hydrocracking embodiments, the charge stock will be typically a gas oil, heavy cracked cycle oil, etc. In addition alkylaromatic and naphthenes can be conveniently isomerized by using the catalyst of the present invention. Likewise, pure hydrocarbons or substantially pure hydrocarbons can be converted to more valuable products by using the catalyst of the present invention in any of the hydrocarbon conversion processes, known to the art, that use a dual-function catalyst.

In a reforming embodiment, it is generally preferred to utilize the instant catalytic composite in a substantially water-free environment. Essential to the achievement of this condition in the reforming zone is the control of the water level present in the charge stock and the hydrogen stream which is being charged to the zone. Best results are ordinarily obtained when the total amount of water entering the conversion zone from any source is held to a level less than 50 ppm and preferably less than 20 ppm; expressed as weight of equivalent water in the charge stock. In general, this can be accomplished by careful control of the water present in the charge stock and in the hydrogen stream. The charge stock can be dried by using any suitable drying means known to the art such as a conventional solid adsorbent having a high selectivity for water; for instance, sodium or calcium crystalline aluminosilicates, silica gel, activated alumina, molecular sieves, anhydrous calcium sulfate, high surface area sodium and the like adsorbents. Similarly, the water content of the charge stock may be adjusted by suitable stripping operations in a fractionation column or like device. And in some cases, a combination of adsorbent drying and distillation drying may be used advantageously to effect almost complete removal of water from the charge stock. Preferably, the charge stock is dried to a level corresponding to less than 20 ppm of $H_2O$ equivalent. In general, it is preferred to maintain the hydrogen stream entering the hydrocarbon conversion zone at a level of about 10 to about 20 volume ppm of water or less. In the cases where the water content of the hydrogen stream is above this range, this can be conveniently accomplished by contacting the hydrogen stream with a suitable desiccant such as those mentioned above at conventional drying conditions.

In the reforming embodiment, an effluent stream is withdrawn from the reforming zone and passed through a cooling means to a separation zone, typically maintained at about 25° to 150° F., wherein a hydrogen-rich gas is separated from a high octane liquid product, commonly called an "unstabilized reformate." When a super-dry operation is desired, at least a portion of this hydrogen-rich gas is withdrawn from the separation zone and passed through an adsorption zone containing an adsorbent selective for water. The resultant substantially water-free hydrogen stream can then be recycled through suitable compressing means back to the reforming zone. The liquid phase from the separation zone is typically withdrawn and commonly treated in a fractionating system in order to adjust the butane concentration, thereby controlling front end volatility of the resulting reformate.

The hydrocarbon conversion conditions utilized in the numerous hydrocarbon conversion embodiments of the present invention are those customarily used in the art for the particular reaction, or combination of reactions, that is to be effected. For instance, alkylaromatics and paraffin isomerization conditions include: a temperature of about 32° to about 1000° F. and preferably about 75° to about 600° F.; a pressure of atmospheric to about 100 atmospheres; a hydrogen to hydrocarbon mole ratio of about 0.5:1 to about 20:1 and a LHSV (calculated on the basis of equivalent liquid volume of the charge stock contacted with the catalyst per hour divided by the volume of conversion zone containing catalyst) of about 0.2 hr.$^{-1}$ to 10 hr.$^{-1}$. Dehydrogenation conditions include: a temperature of about 700° to about 1250° F., a pressure of about 0.1 to about 10 atmospheres, a liquid hourly space velocity of about 1 to 40 hr.$^{-1}$ and a hydrogen to hydrocarbon mole ratio of about 1:1 to 20:1. Likewise, typical hydrocracking conditions include: a pressure of about 500 psig, to about 3000 psig; a temperature of about 400° to about 900° F.; a LHSV of about 0.1 hr.$^{-1}$ to about 10 hr.$^{-1}$; and hydrogen circulation rates of about 1000 to 10,000 SCF per barrel of charge.

Reforming conditions include a pressure of about 0 psig to about 1000 psig, with the preferred pressure being about 50 psig to about 600 psig. Particularly good results are obtained at low pressure; namely, a pressure of about 50 to 350 psig. The catalyst of the present invention allows the operation of a continuous reforming system to be conducted at low pressure (i.e. 30 to about 350 psig). On the other hand, the stability feature of the present invention enables reforming operations conducted at pressures of 250 to 600 psig to achieve substantially increased catalyst life before regeneration.

Reforming conditions include a temperature in the range of from about 600° to about 1100° F. and preferably about 800° to about 1050° F. As is well known to those skilled in the reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product.

The reforming conditions in the present invention also typically include sufficient hydrogen to provide an amount of about 1 to about 20 moles of hydrogen per mole of hydrocarbon entering the reforming zone, with excellent results being obtained when about 5 to about 10 moles of hydrogen are used per mole of hydrocarbon. Likewise, the liquid hourly space velocity (LHSV) used in reforming is selected from the range of about 0.1 to about 10 hr.$^{-1}$, with a value in the range of about 1 to about 5 hr.$^{-1}$ being preferred.

Before proceeding to specific working examples of the present invention, it is necessary to define certain terms used in the art to measure how well a particular catalyst performs its intended functions in a particular hydrocarbon reaction environment. There are three basic analytical terms which will be utilized in the present discussion. These are activity, selectivity, and stability. For purposes of discussion herein these terms are conveniently defined for a given charge stock as follows: (1) activity is a measure of the catalyst's ability to convert hydrocarbon reactants into products at a specified severity level where severity level means the reaction conditions used—i.e., the temperature, pressure, contact time, and presence of diluents such as hydrogen; (2) selectivity refers to the amount of desired product or products obtained relative to the amount of reactants charged; (3) stability refers to the rate of change with time of activity and selectivity parameters—obviously, the smaller rate implying the more stable catalyst. In a reforming process, the given hydrocarbon conversion process exemplified in the present discussion, activity commonly refers to the amount of conversion that takes place for a given charge stock at a specified severity level and is typically measured by octane number of the $C_5$-plus product steam; selectivity usually refers to the amount of $C_5$-plus yield that is obtained at the particular severity or activity level relative to the amount of the charge stock; and stability is typically equated to the rate of change with time of activity, as measured by octane number of $C_5$-plus product and of selectivity as measured by $C_5$-plus yield. Generally a reforming process is run to produce a constant octane $C_5$-plus product with a severity level being continuously adjusted to attain this result. Furthermore, the severity level for this process is usually varied by adjusting the conversion temperature in the reaction zone so that the rate of change of activity finds response in the rate of change of conversion temperature, and changes in this last parameter are customarily taken as indicative of activity stability.

Given these considerations the following represent working examples which are given to illustrate further the preparation and use of the catalytic composite of the present invention in the conversion of hydrocarbons. As indicated above, the specific hydrocarbon conversion process exemplified is catalytic reforming. It is to be understood that the examples are intended to be illustrative and in no way restrictive on the otherwise broad embodiments of the present invention as set forth in the claims appended hereto.

EXAMPLE I

Figure 1:
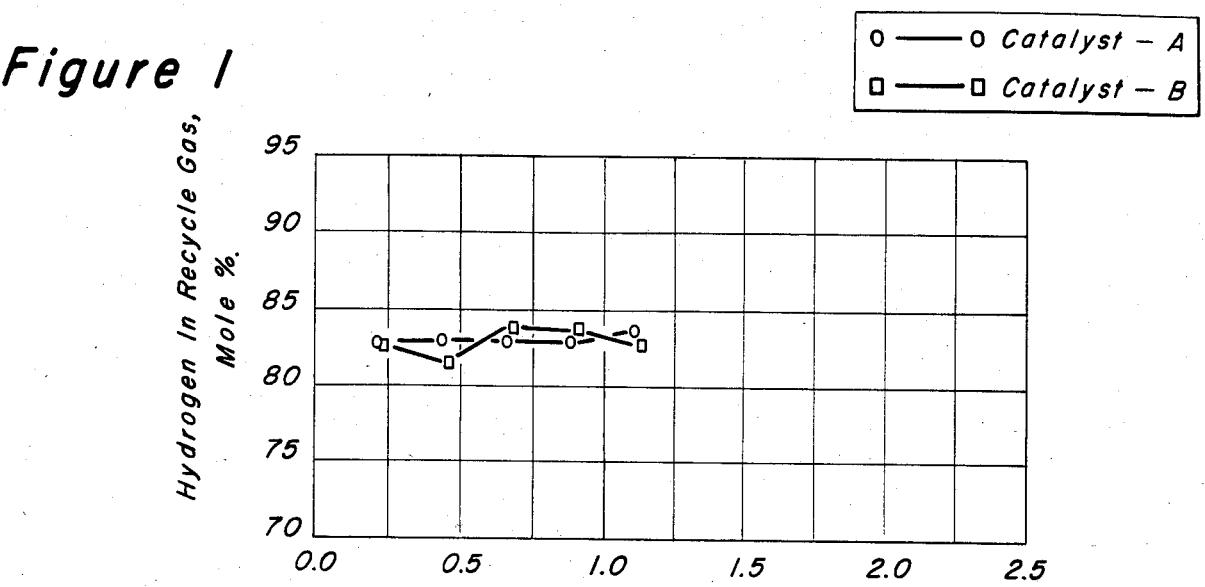
FIG. 1 is a graphical depiction of the mole percent of hydrogen in the recycle gas as a function of the catalyst life in barrels of charge per pound of catalyst in the reaction zone.

In order to exemplify the catalyst of the present invention a catalyst was prepared in the following manner. A Ziegler alumina support was impregnated with an impregnation solution comprising $H_2PtCl_6$, $HReO_4$, HCl, and $HNO_3$. Following this impregnation step in order to form a first uniform dispersion of platinum and rhenium the impregnated support containing platinum and rhenium was subjected to an oxidation step by contacting the impregnated support with air at a temperature of about 1050° F. The resulting impregnated support, containing a first uniform dispersion of platinum and rhenium in their oxidized states, was then impregnated with an indium-containing impregnation solution in order to form the second dispersion of indium component. The indium impregnation solution comprised an aqueous solution of $InCl_3$, HCl, and $HNO_3$. After this impregnation step the catalyst was subjected to an oxidation step in air at a temperature of about 1050° F. The resulting composite comprising a first uniform dispersion of platinum and rhenium and a second dispersion of indium was then subjected to a reduction step in hydrogen at a temperature of about 975° F. The resulting catalyst was thereafter sulfided to a sulfur level of about 0.05 wt. % by contact with a sulfur-containing gas at a temperature of about 25° C. The resulting catalyst contained about 0.25 wt. % platinum, 0.25 wt. % rhenium, 0.375 wt. % indium, about 0.05 wt. % sulfur, and 1.05 wt. % chlorine. This catalyst was designated Catalyst "A."

EXAMPLE II

A second catalyst, not in accordance with the invention, was prepared by the following method. A Ziegler alumina support was again impregnated with an impregnation solution containing platinum and rhenium substantially as set forth in Example I above. However, in this case the platinum and rhenium impregnated support was not subjected to an oxidation step. Accordingly, a first uniform dispersion of platinum and rhenium as defined herein was not formed. After impregnation with the platinum and rhenium component the catalyst was subjected to a second impregnation with an aqueous acid solution of $InCl_3$. The resulting impregnated support was thereafter subjected to an oxidation step in air at a temperature of about 1050° F. The oxidized catalyst comprising a single dispersion of platinum, rhenium, and indium was thereafter subjected to a reduction step at a temperature of about 975° F. in hydrogen. The reduced catalyst was then subjected to a sulfiding step as set forth in Example I. The final catalyst comprised about 0.25 wt. % platinum, about 0.25 wt. % rhenium, about 0.375 wt. % indium, about 0.05 wt. % sulfur, and about 1.05 wt. % chloride. This catalyst was designated Catalyst "B."

EXAMPLE III

In order to demonstrate the advantages to be derived from the catalyst of the present invention both Catalysts "A" and "B" were tested to determine their performance in the catalytic reforming process. In this test a naphtha boiling range charge stock was contacted with the catalysts emplaced within a pilot plant reaction zone. The pilot plant comprised a reaction zone section and product separation facilities. A hydrogen recycle stream was employed recycling hydrogen from the product separation facilities for admixture with the naphtha charge stock prior to contacting the catalyst. The charge stock employed in the test had the following properties.

| FEED PROPERTIES | |
|---|---|
| API Gravity at 60° F. | 58.7 |
| Distillation | |
| IBP, °F. | 176 |
| 5%, °F. | 196 |
| 10%, °F. | 212 |
| 30%, °F. | 236 |
| 50%, °F. | 264 |
| 70%, °F. | 296 |
| 90%, °F. | 326 |
| 95%, °F. | 338 |
| End Point, °F. | 390 |
| Sulfur, ppm by weight | <0.13 |
| Nitrogen, ppm by weight | <0.13 |
| Paraffins, Vol % | 66 |
| Naphthenes, Vol % | 24 |
| Aromatics, Vol % | 10 |

The conditions employed within the reaction zone include a pressure of about 250 psig, a hydrogen to hydrocarbon molar ratio of about 2.0, a liquid hourly space velocity of about 2.5 $Hr^{-1}$. The reaction zone temperatures were adjusted throughout the test in order to maintain a product reformate having a 98 research octane number.

Figure 2:
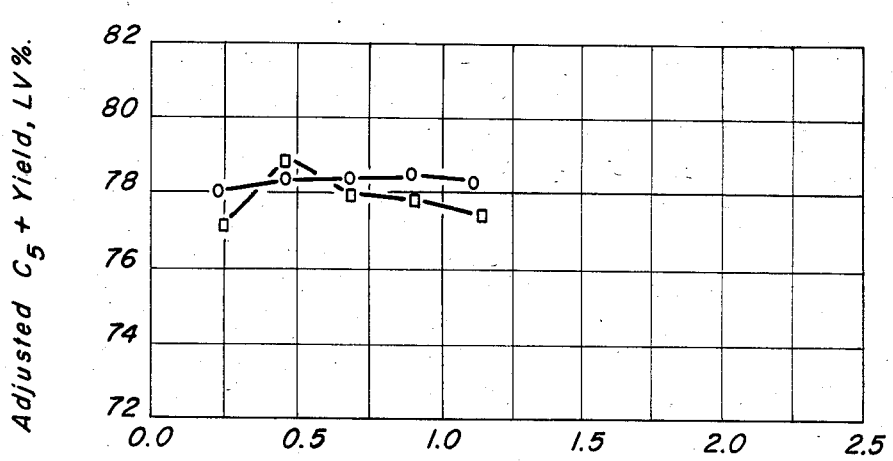
FIG. 2 is a graphical depiction of the $C_5$-plus hydrocarbon reformate yield in liquid volume percent as a function of the catalyst life in barrels of charge per pound of catalyst in the reaction zone.
Figure 3:
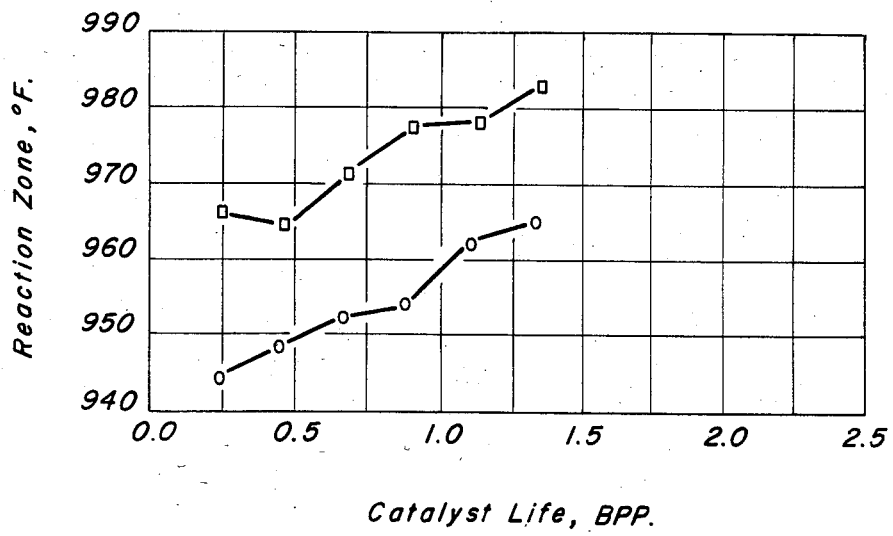
FIG. 3 is a graphical depiction of the reaction zone heater temperature required to achieve a $C_5$-plus reformate unleaded research octane number of 98 as a function of catalyst life in barrels of charge per pound of catalyst in the reaction zone.

The results of this test are set forth in FIGS. 1, 2, and 3. As heretofore indicated FIG. 1 is a graph of the hydrogen purity in mole percent of the recycle gas versus the catalyst life measured in barrels of charge stock process per pound of catalyst. As can be seen in FIG. 1 both Catalysts "A" and "B" exhibit comparable hydrogen purities. The hydrogen purity of the recycle gas is an indication of the extent of undesirable side reactions such as dealkylation and cracking. Accordingly, both Catalysts "A" and "B" exhibit substantially similar patterns in this regard over the life of the tests set forth in FIG. 1.

FIG. 2 is a plot of the yield of $C_5$-plus hydrocarbons in liquid volume percent versus the catalyst life in barrels of charge process per pound of catalyst. In this case it can be seen that Catalyst "A" of the invention results in substantially superior liquid volume yield. Only in one instance (approximately 0.45 barrels per pound catalyst life) did Catalyst "B" exhibit a superior yield of $C_5$-plus material. At all other times Catalyst "A" exhibited superior yields.

FIG. 3 is a graphical depiction of the reaction zone temperature required to achieve a 98 research octane number as a function of the catayst life in terms of barrels of charge process per pound of catalyst. As can be seen in FIG. 3 Catalyst "A" required a much lower reaction zone temperature in order to achieve a $C_5$-plus reformate research octane number of 98. Moreover, surprisingly and unexpectedly the temperature requirements between Catalysts "A" and "B" are on the order of about 20° F.

In summary it can be seen that Catalyst "A" of the invention exhibits higher selectivity for the production of $C_5$-plus liquid reformate and is on average about 20° F. more active than Catalyst "B." Accordingly, by means of the invention it is possible to obtain higher $C_5$-plus liquid volume yields of desirable reformate product at lower reaction zone temperatures thereby leading to improved process yields and substantial savings in utilities for the production of these valuable products.

We claim as our invention:

1. A catalytic composite comprising:

(a) a refractory inorganic oxide selected from the group consisting of silica, alumina, silica-alumina, and crystalline alumina silicates;
(b) a first uniform dispersion of about 0.01 to about 5.0 wt. %, on the weight of the composite, of platinum and about 0.01 to about 5.0 wt. %, on the weight of the composite of rhenium;
(c) a second dispersion of about 0.01 to about 5.0 wt. %, on the weight of the composite, of indium thereover;
(d) about 0.1 to about 10 wt. %, on the weight of the composite, of halogen; and
(e) about 0.01 to about 10.0 wt. %, on the weight of the composite, of sulfur.

2. The catalytic composite of claim 1 further characterized in that the halogen component comprises a chlorine component.

3. The catalytic composite of claim 1 further characterized in that the weight ratio, on an elemental basis, of platinum component to rhenium component is from about 0.3 to about 3.0.

4. The catalytic composite of claim 1 further characterized in that the refractory inorganic oxide comprises alumina.

5. The catalytic composite of claim 4 further characterized in that the alumina support comprises a Ziegler alumina support.

6. A method of preparing a catalytic composite comprising compositing a refractory oxide selected from the group consisting of silica, alumina, silica-alumina, and crystalline alumina silicates, with a first uniform dispersion of about 0.01 to about 5.0 wt. % of platinum, and about 0.01 to about 5.0 wt. % of rhenium, a second dispersion of about 0.01 to about 5.0 wt. % of indium thereover, about 0.1 to about 10 wt. % of halogen, and about 0.01 to about 10 wt. % sulfur, with all proportions based on the weight of the composite.

7. The method of claim 6 further characterized in that the refractory inorganic oxide comprises alumina.

8. The method of claim 7 further characterized in that the alumina comprises a Ziegler alumina.

9. The method of claim 6, further characterized in that the alumina support is composited with the uniform dispersion of platinum and rhenium by an impregnation step followed by oxidation of the resulting impregnated composite and a subsequent halogen adjustment step.

10. The method of claim 9 further characterized in that the halogen adjustment step is immediately followed by a reduction step.

11. The method of claim 9 further characterized in that the impregnation step is effected by a single solution of platinum and rhenium compounds.

12. The method of claim 9 further characterized in that the impregnation is effected sequentially, utilizing a separate solution of platinum compound and a separate solution of rhenium compound.

13. The method of claim 6, further characterized in that the refractory inorganic oxide is composited with the dispersion of indium by an impregnation step followed by oxidation, a halogen adjustment step, and reduction of the resulting halogen adjusted composite.

14. The method of claim 6, further characterized in that a portion of the halogen is composited with the refractory inorganic oxide following the compositing of the uniform dispersion of platinum and rhenium and a portion of the halogen is composited following the compositing of the dispersion of indium.

* * * * *